(12) United States Patent
Sadowsky, IV et al.

(10) Patent No.: US 6,358,551 B1
(45) Date of Patent: Mar. 19, 2002

(54) METHOD OF MANUFACTURE OF NATURAL CHEESE

(75) Inventors: John Richard Sadowsky, IV, Chicago; Sandra A. Trop, Palos Park, both of IL (US); Scott T. Ostergaard, Racine, WI (US)

(73) Assignee: Kraft Foods Holdings, Inc., Northfield, IL (US)

( * ) Notice: Subject to any disclaimer, the term of this patent is extended or adjusted under 35 U.S.C. 154(b) by 0 days.

(21) Appl. No.: 09/742,903

(22) Filed: Dec. 20, 2000

(51) Int. Cl.$^7$ ............................................. A23C 19/00
(52) U.S. Cl. .................... 426/582; 426/36; 426/522; 426/580
(58) Field of Search ................. 426/582, 580, 426/581, 586, 663, 664, 522, 36

(56) References Cited

U.S. PATENT DOCUMENTS

| | | | |
|---|---|---|---|
| 4,585,357 A | 4/1986 | Ogata | 366/176 |
| 5,958,495 A | 9/1999 | Klinksiek | 426/519 |
| 6,096,352 A | 8/2000 | Kijowski et al. | 426/36 |

*Primary Examiner*—Leslie Wong
(74) *Attorney, Agent, or Firm*—Fitch, Even, Tabin & Flannery

(57) ABSTRACT

A method for incorporating concentrated milkfat into milk to form a concentrated milkfat/milk blend is provided. The concentrated milkfat/milk blend can be used in the preparation of natural cheese. The method provides a cost effective procedure for blending concentrated milk fat and milk without the use of added stabilizers. Fat in the concentrated milkfat/milk blend does not separate during additional processing required in producing a natural cheese from the concentrated milkfat/milk blend. In this process, a reduced-fat milk is blended with concentrated milkfat at a temperature sufficient to melt the concentrated milkfat to form a slurry. The slurry is homogenized, preferably using an in-line jet homogenizer at a pressure of about 90 to about 225 psig or a piston type homogenizer operated at a pressure of about 500 to about 1500 psig, to obtain the concentrated milkfat/milk blend with an average fat particle size of about 1.0 to about 10 microns and a fat particle size distribution such that at least about 90 percent of the fat particles have a particle size of about 1.0 to about 10 microns. The concentrated milkfat/milk blend can be used to prepared natural cheese using conventional cheese-making techniques.

16 Claims, 3 Drawing Sheets

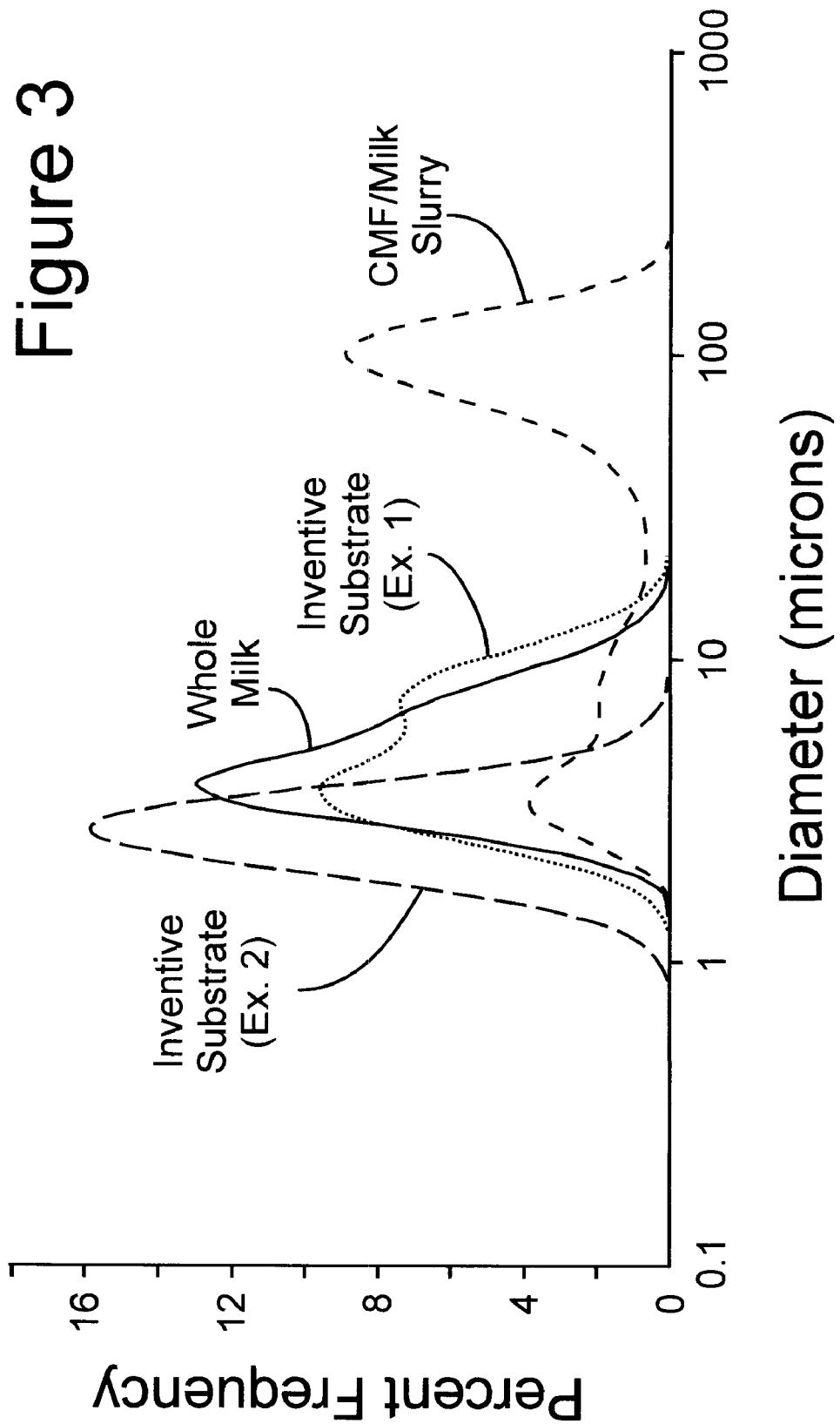

METHOD OF MANUFACTURE OF NATURAL CHEESE

FIELD OF THE INVENTION

The present invention relates to a method for manufacturing natural cheese. More particularly, the present invention provides a method for incorporating concentrated milkfat into milk which can be used in the preparation of natural cheese. The method of incorporating the concentrated milkfat into milk helps insure that loss of milkfat during manufacture of the natural cheese is minimized.

BACKGROUND

Natural cheeses are produced by combining various, but specific, ingredients to produce a resultant cheese. Natural cheeses are generally made by developing acidity in milk and setting the milk with a clotting agent, such as rennet, or by developing acidity to the isoelectric point of the protein. The set milk is cut and whey is separated from the resulting curd. The curd may be pressed to provide a cheese block. Curing typically takes place over a period of time under controlled conditions. Natural cheeses do not contain added emulsifiers and/or stabilizers.

Natural cheeses are distinct from processed cheeses, which are a cheese product manufactured by combining a natural cheese with other ingredients. Processed cheeses are produced by processing (e.g., grinding) natural cheese and then mixing the prepared natural cheese with emulsifying agents (e.g., emulsifying salts). Typically, the resulting mixture is heated and worked to produce a homogenous mass of processed cheese. Accordingly, a processed cheese is literally a natural cheese which has subsequently been processed.

An important step in producing natural cheeses is to provide a milk/milkfat blend with a desired fat level. One method for providing such a milk/milkfat blend is to blend concentrated milkfat with milk to provide a blend with the desired fat level. Concentrated milkfat must be thoroughly mixed with milk and/or cream at proper ratios to prevent the occurrence of defects in the final cheese product. Further, a concentrated milkfat/milk blend must be mixed in a manner effective for preventing fat separation during additional processing steps. Prior to this invention, it has not been possible to use concentrated milkfat/milk blends to prepare natural cheeses.

Regulations governing the production of natural cheeses preclude the use of stabilizers in the milk to prevent fat separation. Accordingly, a cheese-maker must rely on proteins normally present in the native milk to act as emulsifiers for any non-native fat added to the process. In this regard, native protein in the milk and non-native fat must be brought together under certain homogenization conditions to prevent fat separation during additional processing. Current methods for incorporating concentrated milkfat into a milk stream relies on the use of piston-type homogenization. Due to high pressures and moving parts, piston-type homogenizers are capital intensive and difficult to maintain. Moreover, it is difficult to consistently obtain particle size distributions similar to that of natural milk.

It would be desirable, therefore, to provide less expensive methods to incorporate fat, especially milkfat, into milk for use in the manufacture of natural cheese. It would also be desirable, therefore, to provide methods to incorporate fat, especially milkfat, to provide milk substrates having particle size properties essentially the same as natural milk and which can be used in the manufacture of natural cheese. The present invention provides such methods.

SUMMARY

The present invention is directed to a method for incorporating concentrated milkfat (generally greater than about 70 percent fat) into milk to form a concentrated milkfat/milk blend or substrate which can be used in the preparation of natural cheese. The invention provides a cost effective method for blending concentrated milkfat and milk without the use of added stabilizers. This invention is also directed to a method for the production of natural cheese using a milk substrate prepared from a concentrated milkfat and milk blend. In an important aspect of the invention, the method is effective for providing a concentrated milkfat/milk blend or substrate where fat does not separate during additional processing required in producing natural cheese.

The cost of milkfat, either in the form of cream (fat content of about 18 to 45 percent fat) or concentrated milkfat (fat content of greater than about 70 percent fat), can vary significantly through the year. Generally, the cost is lower in the first half of the year and higher in the second half. For example, the maximum cost of concentrated milkfat in the second half of the year is often as much as 50 percent higher than the minimum cost in the first half. Thus, it would be very advantageous to collect and store milkfat during period of low cost for use at other times of the year. Concentrated and frozen milkfat can be stored for extended periods (generally at least about 12 months), thereby making it an excellent vehicle for storing milkfat for later use. Unfortunately, it has not been possible to use such concentrated milkfat for preparing natural cheeses since stabilizers have been required to form milk substrates using concentrated milkfat.

Since stabilizers are not allowed in natural cheese under the current Standards of Identity, it has not been possible to prepare natural cheeses using concentrated milkfat/milk blends. This present invention provides a method for preparing concentrated milkfat/milk blends without the use of added emulsifiers and/or stabilizers. Using such concentrated milkfat/milk blends, natural cheeses can now be prepared which are virtually identical to natural cheeses prepared from natural milk. Using this invention, milkfat can be collected and stored as concentrated milkfat during periods of low cost for later conversion to natural cheeses. Moreover, during periods of high milkfat cost, full-fat milk can be skimmed, the cream sold for other uses, and milkfat replaced using concentrated milkfat to produce a milk substrate that can be used to prepare natural cheeses, thereby increasing the overall efficiencies and economic return associated with the production of natural cheese.

In one embodiment of the present invention and is generally illustrated in FIG. 1, native fat in raw milk is reduced to provide a reduced-fat raw milk containing less than about 3 percent fat and preferably a skim milk containing about 0.05 to about 2 percent fat. The resulting cream can be sold as is or used in other products. A first portion of the reduced-fat raw milk is heated to about 125 to about 145° F. and concentrated milkfat (or other fat), preferably in the form of relatively small particles, is added to the milk at a level of about 4 to about 10 percent to form a slurry. The slurry is maintaining at this elevated temperature until all of the concentrated milkfat has melted. The slurry is homogenized to obtain a concentrated milkfat/milk blend or substrate containing fat particles having an average particle size and a particles size distribution similar to natural milk. More specifically, the fat particles in the substrate have an average diameter of about 1.0 to about 10.0 microns and a particle size distribution such that at least about 90 percent of the fat particles in the substrate should have diameters of about 1.0 to about 10.0 microns. More preferably, the fat particles in the substrate have an average diameter of about 1.0 to about 5.0 microns and a particle size distribution such that at least about 90 percent of the fat particles in the substrate should have diameters of about 1.0 to about 5.0 microns. Preferably the homogenization is effected using a jet homogenizer, and more preferably an in-line jet homogenizer, at a pressure of about 90 to about 200 psig.

The resulting milkfat/milk blend may be used for the production of natural cheese using conventional procedures. More preferably, the resulting milkfat/milk blend, after pasteurization and cooling (preferably to below about 100° F.), is blended with additional pasteurized reduced-fat milk (also preferably cooled to below about 100° F.), in a final blending step to form a standardized blended substrate which is then used for the production of natural cheese. Preferably and as illustrated in FIG. 1, the additional reduced-fat milk, preferably skim milk, is also obtained as a second portion of the reduced-fat milk treated in the separator. Preferably, the resulting standardized blended substrate formed in the final blending step contains about 25 to about 50 percent milkfat/milk blend (i.e., the first portion from the separator) and about 50 to about 75 percent reduced-fat milk (i.e., the second portion from the separator), and even more preferably, about 25 to about 35 percent milkfat/milk blend and about 65 to about 75 reduced-fat milk. Importantly, the fat droplet size of the resulting milkfat/milk blend and/or the standardized blended substrate, is sufficiently small such that fat loss is minimized during the manufacture of the desired natural cheese.

Another embodiment of the present invention is illustrated in FIG. 2. This embodiment differs from the first embodiment discussed above mainly in that the reduced-fat milk of portions 1 and 2 need not be taken directly from a cream separator and that the reduced-fat milk of portions 1 and 2 need not be taken from the same source and can, if fact, be different starting materials. Thus, for example, the reduced-fat milk starting materials for portions 1 and 2 can differ, if desired, in fat content, protein content, and the like. Like the first embodiment, the resulting standardized milk substrate can be used to prepare natural cheese using conventional cheese-making techniques.

BRIEF DESCRIPTION OF THE DRAWINGS

FIG. 3 illustrates the fat particle size distribution in concentrated milkfat/milk blends prepared by the method of this invention as compared to the fat particle size distribution in a natural milk sample and an untreated concentrated milkfat/milk blend.

DETAILED DESCRIPTION

Figure 1:
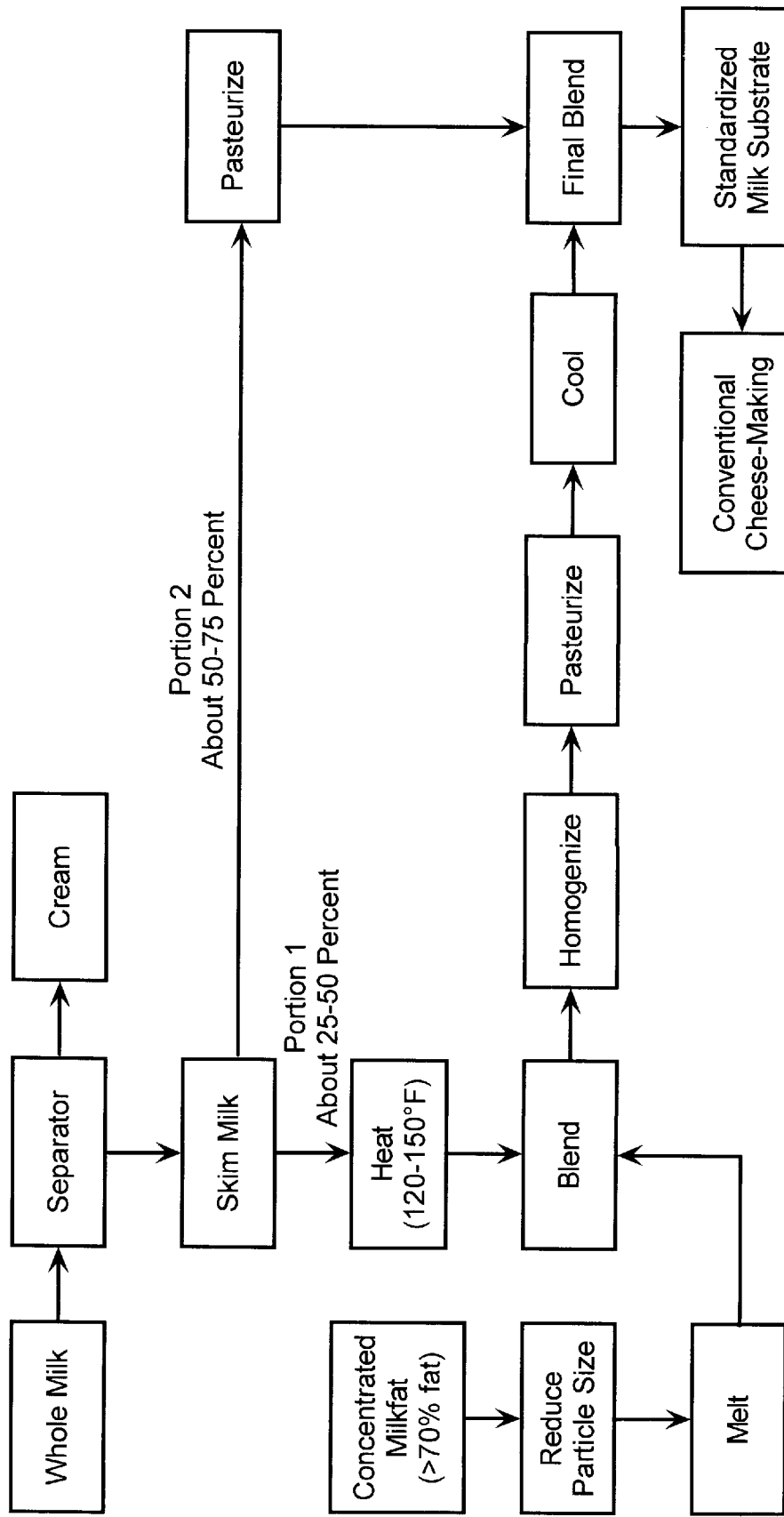
FIG. 1 provides a flow chart illustrating the general process of the present invention for producing a blended substrate using concentrated milkfat and reduced-fat milk.

The present invention is directed to a method for incorporating concentrated milkfat into milk to produce a concentrated milkfat/milk blend which has fat particle size characteristics is essentially identical to natural milk. The present invention is directed to a method for incorporating concentrated milkfat into milk to produce a concentrated milkfat/milk blend which has fat particle size characteristics is essentially identical to natural milk and which can be used in the preparation of natural cheese. The invention provides a cost effective method for blending concentrated milk fat and milk without the use of added stabilizers. This invention is also directed to a method for the production of natural cheese using a milk substrate prepared from a concentrated milkfat and milk blend. In an important aspect of the invention, the method is effective for providing a concentrated milkfat/milk blend where fat does not separate during additional processing required in producing the natural cheese.

As used herein, the term "concentrated milkfat" describes a composition prepared by the separation of cream from milk to provide a dairy based composition which is at least about 70 percent milkfat. The concentrated milkfat may be fresh or provided as a frozen concentrate as described in U.S. Pat. No. 6,096,352 (Aug. 1, 2000), which is incorporated herein by reference.

"Substantially free of emulsifiers" and/or "substantially free of stabilizers" are intended to denote compositions in which no significant amount of emulsifier, emulsifiers, stabilizer, and/or stabilizers have been added. Preferably, such a composition would contain less than about 2.5 percent emulsifier or stabilizer; and more preferably, less than about 0.1 percent emulsifier or stabilizer. Thus, conventional emulsifiers normally used to prepare process cheese such as, for example, disodium phosphate, trisodium phosphate, tripotassium citrate, trisodium citrate, and the like, are neither required or desired. Likewise, conventional stabilizers normally used to prepare concentrated milkfat/ milk blends such as, for example, lecthin, mono- and diglycerides, polysorbates, sodium stearoyl lactaylate, and the like, are neither required or desired. By avoiding the use of such emulsifiers and/or stabilizers. The cheeses produced using the concentrated milkfat/milk blend can be classified as natural cheeses under the current Standards of Identity.

As used herein, the term "natural cheeses" refers to cheese that may be derived from the treatment of any dairy liquid or substrate that provides cheese curds upon renneting (regardless of whether it meets the current Standards of Identity) and which is substantially free of emulsifiers and/or stabilizers. Such liquids include whole milk, reduced fat milk, skim milk, and any such milk further containing added dairy fractions. Such dairy fractions may be chosen, by way of nonlimiting example, from cream fractions, concentrated milk fractions obtained, for example, by evaporation, diafiltration and/or ultrafiltration of milk, and comparably treated dairy liquids. The dairy liquid employed in the cheese making fermentation may further contain dried solid components of milk fractions, such as non-fat dry milk, cream solids, and the like.

As used herein, "dairy liquid" relates to milk, milk products obtained by fractionating raw milk to provide a liquid fraction, or reconstituted solid milk fractions. For example, the milk may be treated to remove some or all of the butterfat, providing low fat milk or skim milk, respectively. Furthermore, whole milk, low fat milk, or skim milk may be concentrated by methods such as evaporation and/or ultrafiltration (with or without diafiltration) and the like. Evaporation provides dairy liquids containing a higher concentration of all the nonvolatile components, whereas ultrafiltration provides dairy liquids with a higher concentration of the components that are nonpermeable to the ultrafiltration membrane. In any case, the dairy proteins including casein and whey protein are included among the retained solids, such that their concentrations in the resulting liquids are increased. Furthermore any of the above dairy liquids may be evaporated to dryness, providing milk solids originating from whole milk, low fat milk, or skim milk. Any of these solids may be reconstituted by the addition of water or a suitable aqueous composition including milk or a milk fraction. Reconstitution of dry milk thus provides dairy liquids that in general may have a broad range of final concentrations of the component proteins, butterfat, and other components. All the above liquids are included in the designation of "dairy liquids" as used herein.

Rennet is a generic term used in the field of dairy science and in the field of cheese making to designate an activity obtained from the lining of the stomachs of immature mammals that consume maternal milk. The natural function of rennet is to initiate the digestion of the milk in order to provide the nutrition contained in the milk protein to the young mammal. In cheese making, rennet is used to clot the dairy liquids, thereby forming cheese curd and whey. The term "renneting" relates to the process of treating a dairy liquid with a rennet to provide a cheese curd and whey. Synonyms for "renneting" include "curding," "clotting," and "setting". As used in contemporary dairy science, "rennet" connotes the enzyme earlier called "rennin" and now termed "chymosin". Chymosin is a member of the family of proteases known as aspartyl endopeptidases.

Figure 2:
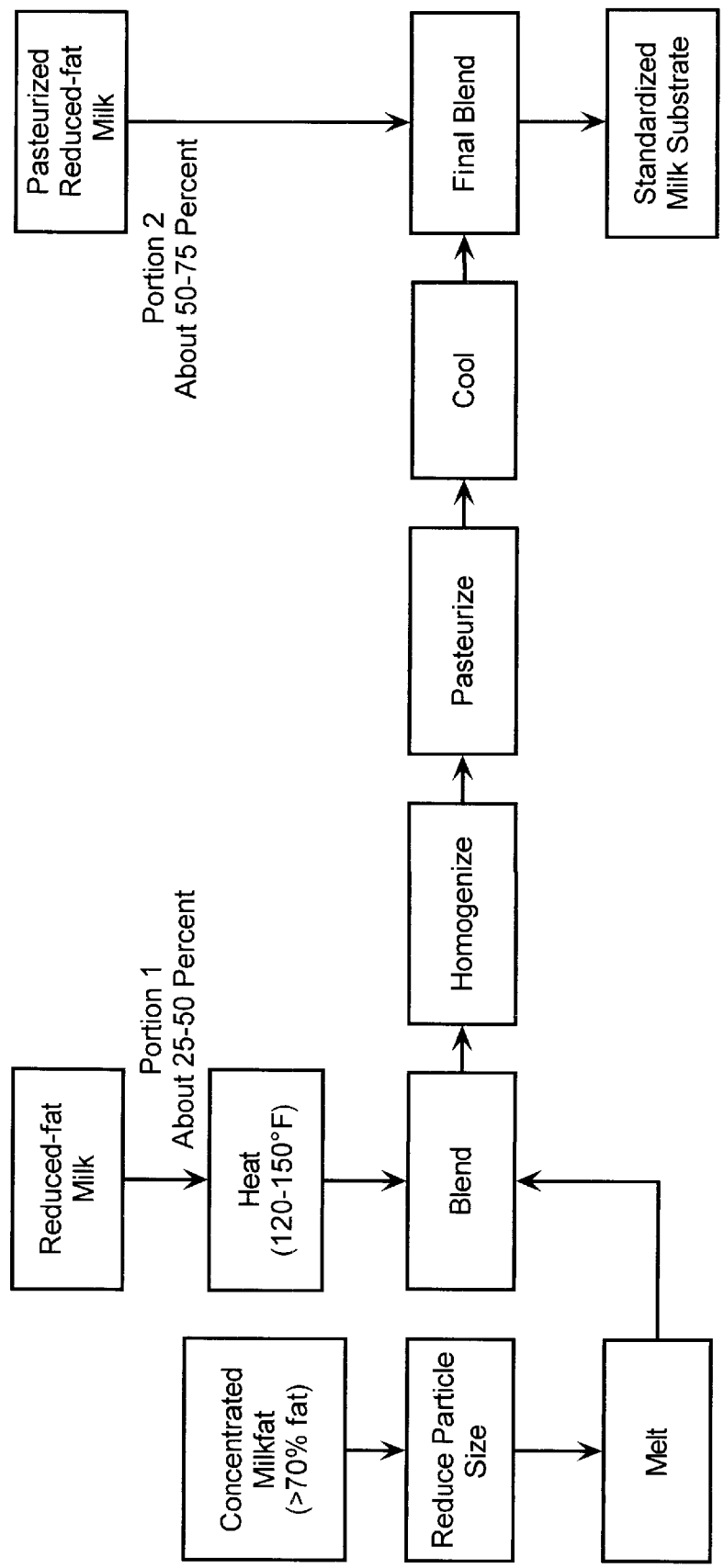
FIG. 2 provides a flow chart illustrating the general process of the present invention for producing natural cheeses starting with whole milk.

The method of this invention are generally illustrated in FIGS. 1 and 2. As shown in FIG. 1, native fat in raw milk is reduced to provide a reduced-fat raw milk containing less than about 3 percent fat and preferably a skim milk containing about 0.05 to about 2 percent fat. The resulting cream (preferably containing greater than about 16 percent fat, and more preferably about 40 to about 45 percent fat) can be sold as is or used in other products. A first portion of the reduced-fat raw milk is heated to about 125 to about 145° F. and concentrated milkfat (or other fat), preferably in the form of relatively small particles, is added to the milk at a level of about 4 to about 10 percent to form a slurry. Preferably, the concentrated milkfat, normally in the form of large blocks (e.g., about 25 to about 55 lbs) at a temperature of less than about 32° F., and more preferably less than about 0° F., is first ground to relatively small particles (e.g., on the order of about fraction of inches to a few inches in any one dimension) in order to increase the surface area to make melting easier. The amount of concentrated milkfat added will, of course, depend on the amount of milkfat desired in the final milk substrate. Generally, the amount of concentrated milkfat added to the first portion of the reduced-fat raw milk is about 4 to about 10 percent. The slurry is maintaining at this elevated temperature until all of the concentrated milkfat has melted. The slurry is homogenized to obtain a concentrated milkfat/milk blend or substrate containing fat particles having an average particle size and a particles size distribution similar to natural milk. More specifically, the fat particles in the substrate should have an average diameter of about 1.0 to about 10.0 microns and a particle size distribution such that at least about 90 percent of the fat particles in the substrate have diameters of about 1.0 to about 10.0 microns. More preferably, the fat particles in the substrate have an average diameter of about 1.0 to about 5.0 microns and a particle size distribution such that at least about 90 percent of the fat particles in the substrate have diameters of about 1.0 to about 5.0 microns. The homogenization can be carried out with convention homogenizers so long as the desired particle size and particle size distribution can be achieved. Preferably the homogenization is effected using a jet homogenizer, and more preferably an in-line jet homogenizer, at a pressure of about 90 to about 200 psig.

The resulting milkfat/milk blend may be used for the production of natural cheese using conventional procedures. More preferably, the resulting milkfat/milk blend, after pasteurization and cooling (preferably to below about 100° F.), is blended with additional pasteurized reduced-fat milk (also preferably cooled to below about 100° F.) in a final blending step to form a standardized blended substrate which is then used for the production of natural cheese. Preferably and as illustrated in FIG. 1, the additional reduced-fat milk, preferably skim milk, is also obtained as a second portion of the reduced-fat milk treated in the separator. Preferably, the resulting standardized blended substrate formed in the final blending step contains about 25 to about 50 percent milkfat/milk blend (i.e., the first portion from the separator) and about 50 to about 75 percent reduced-fat milk (i.e., the second portion from the separator), and even more preferably about 25 to about 35 percent milkfat/milk blend and about 65 to about 75 reduced-fat milk. Importantly, the fat droplet size of the resulting milkfat/milk blend and/or the standardized blended substrate, is sufficiently small such that fat loss is minimized during the manufacture of the desired natural cheese.

FIG. 2 illustrates another embodiment of the present invention. This embodiment differs from the first embodiment discussed above mainly in that the reduced-fat milk of portions 1 and 2 need not be taken directly from a cream separator and that the reduced-fat milk of portions 1 and 2 need not be taken from the same source and can, if fact, be different starting materials. Thus, for example, the reduced-fat milk starting materials for portions 1 and 2 can differ, if desired, in fat content, protein content, and the like. Like the first embodiment, the resulting standardized milk substrate can be used to prepare natural cheese using conventional cheese-making techniques.

Importantly, the standardized milk substrate produced in this invention is similar in many respects to natural milk and can be used to prepare natural cheeses. More specifically, the standardized milk substrate produced in this invention has an average particle size and a particle size distribution similar to natural milk. More specifically, the fat particles in the standardized milk substrate should have an average diameter of about 1.0 to about 10.0 microns and a particle size distribution such that at least about 90 percent of the fat particles in the standardized milk substrate have diameters of about 1.0 to about 10.0 microns. More preferably, the fat particles in the standardized milk substrate should have an average diameter of about 1.0 to about 5.0 microns and a particle size distribution such that at least about 90 percent of the fat particles in the standardized milk substrate have diameters of about 1.0 to about 5.0 microns. The homogenization can be carried out with convention homogenizers so long as the desired particle size and particle size distribution can be achieved. Preferably the homogenization is effected using a jet homogenizer, and more preferably an in-line jet homogenizer, at a pressure of about 90 to about 200 psig. Examples of suitable jet homogenizers are provided in U.S. Pat. No. 4,585,357 (Apr. 29, 1986) and U.S. Pat. No. 5,958,495 (Sep. 28, 1999), both of which are incorporated by reference.

The ability of a homogenizer to reduce and control fat particle size is determined by the disruption of fat globules. The best measure and/or monitoring of this disruption is through controlling pressure generated within the homogenizer. In operation, the particle size and particle size distribution can be determined as a function of homogenization conditions in order to determine operating parameters to achieve the desired particle size and particle size distribution. For jet or impingement homogenizers (see, e.g., Example 1), fat globules are disrupted when two streams of substrate make contact with one another at high pressures and at a perpendicular angle. Because the angle is fixed, the only way to control particle size is to increase the velocity with which they make contact. Velocity is generated by a pump feeding liquid through the orifices of the homogenizer. The speed of the pump can be changed to generate different pressures, these different pressures are measured as back pressure at the inlet of the jet unit. Velocity can also be increased by reducing the number of orifices while maintaining the same overall flowrate through the homogenizer. This is accomplished but replacing one or more orifice nozzles with "plugs" to block flow and force fluid through a smaller overall cross-section of nozzle area. For Example 1, an APV Hydroshear 40 jet homogenizer was setup with a series of nozzles and plugs to produce 8 streams, and thus 4 impingement zones. The pressure can be controlled by changing the pump speed.

For piston homogenizers (see, e.g. Example 2), fat globules are disrupted when a piston forces the substrate at high velocity through a small channel into a metal impact ring. Homogenization occurs as both mechanical energy from the piston and cavitational energy from high and low pressure zones are imparted on the fat globules. Pressure is controlled by changing the cross-sectional area the channel the fat is forced through. Feed pressure and channel size should be held constant to maintain a steady homogenization. In Example 2, a two-stage piston APV Gaulin homogenizer with standard setup was fed with positive displacement pump at 60 psig. Both stages were used for homogenization. For the first stage, the channel was reduced to approximately 0.1 mm to generate about 500 psig; the second channel was closed until the total pressure reached 750 psig. At higher pressures of about 750 to about 1500 psig, both stages are also employed. At higher pressures, the channel on the first stage would be closed until 500 psig was generated, then the channel on the second stage was closed until the total desired pressure was reached.

The concentrated milkfat/milk blends or substrates produced by the present invention can be used in a conventional cheese-making process to produce natural cheeses which are substantially free of emulsifiers and/or stabilizers. The following examples are intended to illustrate the invention and not to limit it. Unless otherwise indicated, all percentages and ratios are by weight.

Example 1

This example illustrates the production of cheddar cheese using the process of this invention employing a jet or impingement type homogenizer. Raw whole milk (575 lbs; 3.8 percent fat, 3.2 percent protein, and 8.9 percent non-fat solids) was skimmed in a centrifugal separator to produce a reduced-fat milk (2.1 percent fat, 3.3 percent protein, and 9.2 percent non-fat solids). The reduced-fat milk (550 lbs) was heated in a plate-and-frame heat exchanger (Thermaline; Auburn, Wash.) to a temperature of 135° F. and transferred to a jacketed kettle (Viatic, Charlevoix, Mich.) equipped with an impeller mixer (Braun, Holland, Mich.) while maintaining the temperature at about 135° F. Frozen concentrated milkfat (80 percent fat and 19 percent moisture; 55 lbs blocks) was size reduced to approximately ¼"×¼"×3" in an Extractor (Reetz, Santa Rosa Calif.). The ground milkfat (48 lbs; was added to the heated reduced-fat milk (550 lbs: ratio of about 1:9) using mixing to produce turbulent conditions throughout the jacketed kettle; approximately 0.001 percent food grade defoamer was added to reduce froth during agitation. The temperature of the slurry was about 125° F. once the ground milkfat was completely melted. The slurry composition was about 8.4 percent fat, about 3.0 percent protein, and about 8.4 percent non-fat solids.

A Waukesha 30 positive-displacement pump (Waukesha, Delevan, Wis.) was used to force the slurry through an APV Hydroshear 40 impingement homogenizer (APV Gaulin, Everett, Mass.) at a flowrate of about 36 lbs/minute and a back pressure of about 160 psig. The fat particles had an average particle size of about 5.3 microns after homogenization. The homogenized mixture was pasteurized at about 165° F. for about 15 seconds and then added to a 1000 lb double-O cheese vat (Damrow, Fond du Lac, Wis.). The homogenized mixture was blended with a pasteurized reduced-fat milk (600 lbs; 2.0 percent fat, 3.3 percent protein, and 9.2 percent non-fat solids) at a ratio of 1:3 to produce a standardized milk substrate having 4.3 percent fat, 3.3 percent protein, and 9.0 percent non-fat solids.

A cheddar cheese was prepared from the standardized milk substrate using the following procedure. The standardized milk substrate (900 lbs) was heated to about 88° F. in a separate 1000 lb double-O cheese vat. A DVS Lactococcus lactis starter culture (70 g) (Chr. Hansen, Milwaukee, Wis.) was added, by 40 mL of an aqueous calcium chloride (40 percent) solution. After a 30 minute ripening period, 60 mL of Chymax 2× rennet (Chr. Hansen, Milwaukee Wis.) was added to set the coagulum. After a 35 minute set, the coagulum was then cut. After 3 minute heal, the curd was cooked at 102° F. for 35 minutes followed by 30 minutes stirring without further heating. The cooked curd was pumped to a drain table where it was matted and cheddared for 3 hours. After draining, the cheddar curd was milled and salted at 0.025 lbs salt/lbs curd. The salted curd was hooped and pressed under 35 psig for 8 hours before vacuum packing in 40 lbs blocks.

For comparison purposes, a control cheddar cheese was prepared using essentially the same procedure starting with a conventional milk substrate. The conventional milk substrate was prepared by blending pasteurized whole milk (1000 lbs: 3.8 percent fat, 3.2 percent protein, and 8.9 percent non-fat solids) and pasteurized sweet cream (9 lbs: 43.9 percent fat, 1.8 percent protein, and 5.0 percent non-fat solids). The resulting conventional milk substrate had 4.2 percent fat, 3.2 percent protein, and 9.0 percent non-fat solids. The fat particles had an average particle size of about 4.8 microns.

The following data was obtained for the inventive milk substrate and the conventional milk substrate:

|  | Control Milk Substrate | | Inventive Milk Substrate | |
| --- | --- | --- | --- | --- |
|  | Fat (%) | Protein (%) | Fat (%) | Protein (%) |
| Milk | 3.8 | 3.2 | 2.1 | 3.3 |
| Sweet Cream | 43.9 | 1.8 | — | — |
| Milkfat Slurry | — | — | 8.4 | 3.0 |
| Standardized Milk Substrate | 4.2 | 3.2 | 4.3 | 3.2 |
| Whey (drain table) | 0.65 | — | 0.69 | — |
| Whey (at pressing) | 0.16 | — | 0.33 | — |

|  | Control Milk Substrate | Inventive Milk Substrate |
| --- | --- | --- |
| Specific Surface Area (cm²/cm³) | 15,025 | 14,827 |
| Median Diameter (μ) | 4.15 | 4.43 |
| Mean Diameter (μ) | 4.84 | 5.34 |
| Mean Diameter (μ) at percentage |  |  |
| 10% | 2.60 | 2.37 |
| 30% | 3.35 | 3.30 |
| 50% | 4.16 | 4.47 |
| 70% | 5.44 | 6.37 |
| 90% | 8.12 | 9.57 |

As shown in the above table, the milk substrate prepared by the inventive method was essentially equivalent to conventional milk substrates (e.g., reduced-fat milk standardized with cream) of comparable fat and protein contents used in cheese-making. For comparison purposes, a comparable unhomogenized milkfat slurry had median and mean diameters of about 59 and about 58 microns, respectively. The particle size distributions of the various samples are shown in FIG. 3.

The cheddar cheese prepared from the inventive substrate and the conventional substrate, after aging 30 days, are comparable in organoleptic and other properties. Thus, cheeses can be prepared from reduced-fat milk standardized with concentrated milkfat which are comparable to cheeses prepared from conventional milk substrates (e.g., reduced-fat milk standardized with cream).

EXAMPLE 2

This example illustrates the production of cheddar cheese using the process of this invention employing a piston type homogenizer. Raw whole milk (2080 lbs; 3.6 percent fat, 3.3 percent protein, and 8.9 percent non-fat solids) was skimmed in a centrifugal separator to produce a reduced-fat milk (2.0 percent fat, 3.3 percent protein, and 9.1 percent non-fat solids). The reduced-fat milk (2000 lbs) was heated and maintained in a jacketed double-O cheese vat (Damrow, Fond Du Lac. Wis.) at a temperature of 135° F. by circulating steam through the jacket. Frozen concentrated milkfat (80 percent fat and 19 percent moisture; 55 lbs blocks) was size reduced to approximately ¼"×¼"×3" in an Extructor (Reetz, Santa Rosa, Calif.). The ground milkfat (83 lbs) was added to the heated reduced-fat milk (2000 lbs; ratio of about 1:25). Mixing provided by the double-O agitators kept the melted milkfat in suspension; approximately 0.001 percent food grade defoamer was added to minimize foam during agitation. The temperature of slurry was approximately 130° F. once the ground milkfat was completely melted. The slurry composition was 3.9 percent fat, 3.2 percent protein and 8.9 percent non-fat solids.

A Waukesha 30 positive-displacement pump (Waukesha, Delavan, Wis.) was used to feed a Gaulin piston-type homogenizer 75DJF38BS (APV Gaulin, Everett, Mass.) at a feed pressure of 60 psig. The slurry was homogenized using both stages of the two-stage homogenizer, with the first stage generating a pressure of 500 psig and the second stage generating 250 psig for a total of 750 psig. The fat had an average particle size of 2.64 microns after homogenization. The homogenized mixture was pasteurized at 163° F. for 15 seconds and then added to a 1000 lb double-O cheese vat (Damrow, Fond Du Lac, Wis.). The homogenized mixture (330 lbs) was blended with a pasteurized reduced-fat milk (640 lbs; 2.0 percent fat, 3.3 percent protein and 9.0 percent non-fat solids) and pasteurized cream (30 lbs; 43.3 percent fat, 1.8 percent protein and 4.9 percent non-fat solids) to prepare a standardized milk substrate. The standardized milk substrate had the following particle size properties:

|  | Inventive Milk Substrate |
| --- | --- |
| Specific Surface Area (cm²/cm³) | 25,545 |
| Median Diameter (μ) | 2.5 |
| Mean Diameter (μ) | 2.64 |
| Mean Diameter (μ) at percentage |  |
| 10% | 1.60 |
| 30% | 2.09 |
| 50% | 2.51 |
| 70% | 2.98 |
| 90% | 3.83 |

The particle size distribution of the this sample is also shown in FIG. 3.

Using this standardized milk substrate. cheddar cheese was prepared using the same procedure as Example 1. The resulting cheddar cheese, after aging, had excellent organoleptic properties.

Numerous modifications and variations in practice of the invention are expected to occur to those skilled in the art upon consideration of the foregoing detailed description of the invention. Consequently, such modifications and variations are intended to be included within the scope of the following claims.

What is claimed is:

1. A method for incorporating concentrated milkfat into milk, the method comprising:

(1) blending concentrated milkfat with milk at a temperature sufficient to melt the concentrated milkfat to form a slurry; and (2) homogenizing the slurry to provide a concentrated milkfat milk blend having fat particles with an average diameter of from about 1.0 to about 10 microns and with at least about 90 percent of the fat particles having a particle size of about 1.0 to about 10 microns, wherein the concentrated milkfat/milk blend is suitable for preparing a natural cheese.

2. The method of claim 1, wherein the milk has a fat content of about 0.01 to about 3 percent.

3. The method of claim 1, wherein the slurry contains from about 4 to about 10 percent concentrated mIlkfat and about 90 to about 96 percent milk and wherein the slurry is heated to a temperature of about 125 to about 145° F. prior to initiation of the homogenization.

4. The method of claim 2, wherein the slurry contains from about 4 to about 10 percent concentrated milkfat and about 90 to about 96 percent milk and wherein the slurry is heated to a temperature of about 125 to about 145° F. prior to initiation of the homogenization.

5. The method of claim 1, wherein the slurry is homogenized using a jet homogenizer operated at a pressure of about 90 to about 225 psig or a piston type homogenizer operated at a pressure of about 500 to about 1500 psig.

6. The method of claim 2, wherein the slurry is homogenized using a jet homogenizer operated at a pressure of about 90 to about 225 psig or a piston type homogenizer operated at a pressure of about 500 to about 1500 psig.

7. The method of claim 3, wherein the slurry is homogenized using a jet homogenizer operated at a pressure of about 90 to about 225 psig or a piston type homogenizer operated at a pressure of about 500 to about 1500 psig.

8. The method of claim 4, wherein the slurry is homogenized using a jet homogenizer operated at a pressure of about 90 to about 225 psig or a piston type homogenizer operated at a pressure of about 500 to about 1500 psig.

9. A method for preparing natural cheese using a concentrated milkfat/milk blend, said method comprising:
   (1) preparing a concentrated milkfat/milk blend by a process comprising:
      (A) blending concentrated milkfat with milk at a temperature sufficient to melt the concentrated milkfat to form a slurry; and
      (B) homogenizing the slurry to provide a concentrated milkfat milk blend having fat particles with an average diameter of from about 1.0 to about 10 microns and with at least about 90 percent of the fat particles having a particle size of about 1.0 to about 10 microns;
   (2) pasteurizing the concentrated milkfat/milk blend;
   (3) cooling the pasteurized concentrated milkfat/milk blend to a temperature below about 100° F.;
   (4) forming a standardized milk substrate by blending about 25 to about 50 percent of the cooled and pasteurized concentrated milkfat/milk blend with about 50 to 75 percent of a pasteurized reduced-fat milk;
   (5) treating the standardized milk substrate to form curd and whey;
   (6) separating the curd and whey; and
   (7) treating the curd to form the natural cheese.

10. The method of claim 9, wherein the milk has a fat content of about 0.01 to about 3 percent.

11. The method of claim 9, wherein the slurry contains from about 4 to about 10 percent concentrated milkfat and about 90 to about 96 percent milk and wherein the slurry is heated to a temperature of about 125 to about 145° F. prior to initiation of the homogenization.

12. The method of claim 10, wherein the slurry contains from about 4 to about 10 percent concentrated milkfat and about 90 to about 96 percent milk and wherein the slurry is heated to a temperature of about 125 to about 145° F. prior to initiation of the homogenization.

13. The method of claim 9, wherein the slurry is homogenized using a jet homogenizer operated at a pressure of about 90 to about 225 psig or a piston type homogenizer operated at a pressure of about 500 to about 1500 psig.

14. The method of claim 10, wherein the slurry is homogenized using a jet homogenizer operated at a pressure of about 90 to about 225 psig or a piston type homogenizer operated at a pressure of abouT 500 to about 1500 psig.

15. The method of claim 11, wherein the slurry is homogenized using a jet homogenizer operated at a pressure of about 90 to about 225 psig or a piston type homogenizer operated at a pressure of about 500 to about 1500 psig.

16. The method of claim 12, wherein the slurry is homogenized using a jet homogenizer operated at a pressure of about 90 to about 225 psig or a piston type homogenizer operated at a pressure of about 500 to about 1500 psig.

* * * * *